United States Patent [19]

Tsutsumi

[11] Patent Number: 4,717,270
[45] Date of Patent: Jan. 5, 1988

[54] PAPER CIRCULATING ASSEMBLY FOR FIELD SEQUENTIAL MULTI-COLOR PRINTING APPARATUS

[75] Inventor: Teruo Tsutsumi, Tama, Japan

[73] Assignee: Kabushiki Kaisha Toshiba, Japan

[21] Appl. No.: 885,834

[22] Filed: Jul. 15, 1986

[30] Foreign Application Priority Data

Feb. 28, 1986 [JP] Japan ............................... 61-43301
Mar. 27, 1986 [JP] Japan ............................... 61-69036
Mar. 27, 1986 [JP] Japan ............................... 61-69037

[51] Int. Cl.$^4$ ......................... B41J 3/02; B65H 5/16
[52] U.S. Cl. ................................ 400/120; 400/645; 400/583; 346/76 PH; 271/301; 355/14 SH
[58] Field of Search .............. 400/120, 645, 240, 582, 400/613.1, 583, 622, 643; 346/76 PH, 136, 204, 74.7; 271/301; 355/14 SH

[56] References Cited

U.S. PATENT DOCUMENTS

| | | | |
|---|---|---|---|
| 4,192,607 | 3/1980 | Hage | 271/301 |
| 4,517,590 | 5/1985 | Nagashima et al. | 346/76 PH |
| 4,551,729 | 11/1985 | Kubo et al. | 346/76 PH |
| 4,562,443 | 12/1985 | Matsuno et al. | 400/120 |
| 4,586,834 | 5/1986 | Hachisuga et al. | 346/76 PH |
| 4,594,597 | 6/1986 | Liu et al. | 346/76 PH |
| 4,621,270 | 11/1986 | Mizutani et al. | 346/76 PH |
| 4,622,563 | 11/1986 | Watanabe | 346/76 PH |
| 4,647,232 | 3/1987 | Costa | 400/120 |
| 4,649,400 | 3/1987 | Naruki et al. | 346/76 PH |
| 4,665,407 | 4/1987 | Hatiori et al. | 346/76 PH |

Primary Examiner—E. H. Eickholt
Attorney, Agent, or Firm—Banner, Birch, McKie & Beckett

[57] ABSTRACT

A paper circulating assembly is provided for use in a field sequential printing apparatus such as a facsimile. The facsimile includes an ink ribbon having multiple color ink segments. A piece of paper is conveyed ultimately into a printing paper path and to the ribbon and printing platen for printing. The printing platen conveys the leading edge of the printed paper to a gripping arm of the paper circulating assembly. After a predetermined time period, the leading edge of the paper rests in the gap created between the gripping arm and the gripping platen, and the gripping arm closes against the gripping platen. Thereafter, the secured leading edge is conveyed to a recirculating paper path which flows into the printing paper path, and stays in this position until the trailing edge of the printing paper is just about to enter the printing paper path. During this time, the portion of the paper which lies between the gripping arm and the printing platen gathers in a loop in a paper loop area. Afterwards, the gripping platen is rotated and the gripping arm moves away from the surface of the gripping platen, thereby releasing the leading edge of the printing paper. Further rotation conveys the leading edge of the paper into the printing paper path, just behind the trailing edge of the printing paper for printing the subsequent color of ink. This process continues until all ink colors have been printed onto the paper.

12 Claims, 20 Drawing Figures

PAPER CIRCULATING ASSEMBLY FOR FIELD SEQUENTIAL MULTI-COLOR PRINTING APPARATUS

BACKGROUND OF THE INVENTION

1. Technical Field

The present invention relates to the field of multiple-color printing. More particularly, the present invention relates to the printing of multiple-color images onto a printing medium by the use of a field sequential printing technique, such as thermal transfer printing. Specifically, the present invention is directed to an assembly for circulating the paper onto which the multiple-color image is printed using a field sequential printing technique.

2. Background Information

Several methods for printing multiple-color images onto a printing medium are well known in the art. Some examples include ink-jet printing, electrophotography, electrostatic printing, and thermal transfer printing.

In ink-jet printing, the multiple color of the image are printed on the medium by multiple and individual minute nozzles which spray the medium with the appropriate color of ink. The minute nozzles are triggered according to image signals sent from a processor. This method, however, is not well suited for use in high speed printing operations. Additionally, due to the minute size of the nozzle outlet port and the inconsistency of the ink's density and flow characteristics, the device is inherently unreliable because the nozzles have a tendency to clog, thereby hindering ink flow and severely impeding color image printing.

In electrophotograph and electrostatic printing, the color image is printed on the printing medium by transferring appropriately colored toner from a cylindrical drum to the printing medium. An electrostatic latent image is formed on the drum for each desired color, and the drum must be statically neutral prior to each application of a different toner color. In electrophotography, the latent image is formed by means of a laser; in electrostatic printing, the latent image is formed by means of a multi-stylus head. Both methods require as many developing units having toner containers as there are colors to be used. Accordingly, the printing apparatus is rather large and expensive.

The problems of reliability, speed, size and cost inherent with ink-jet, electrophotographic and electrostatic printing methods are generally solved by field sequential printing techniques such as thormal transfer printing devices. In thermal transfer printing, the color image is transferred to the printing medium by transferring colored ink from an ink ribbon to the medium by the application of heat developed at a thermal printing head. Accordingly, the printing process is simplified, with respect to the other types of printing techniques, because there is no need for separate developing units of toner as in the electrophotography or electrostatic printing method or separate ink nozzles as in ink-jet printing.

Figure 1:
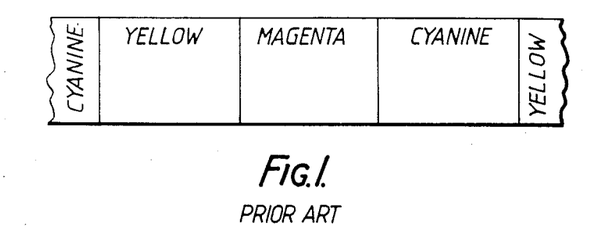
FIG. 1 is an example of an ink ribbon used in field sequential printing.

Turning now to FIG. 1, an example of the ink ribbon for use in thermal transfer printing is shown. As is commonly known to those of ordinary skill in the art, the ink ribbon comprises a base material to which thermally fusable solid ink is coated. The base material is usually either a paper or plastic derivative, and the colors of solid ink are typically yellow, magenta and cyanine. The ribbon's width corresponds generally to the largest width of paper and the horizontal length of the individual color fields of ink corresponds generally to the longest length of paper to be used. During the transfer process of the ink to the printing medium, the thermal printing head is triggered at appropriate points for each unique color of ink on the ribbon.

The ink on the ribbon can be considered to be separated into fields, and therefore thermal transfer printing is also referred to by those skilled in the art as field sequential printing. As used herein, the term "field sequential printing" refers to printing multiple-color images using a ribbon whose ink is segmented into fields such as the ribbon shown in FIG. 1, and should not be limited to the type of print head employed.

Figure 2:
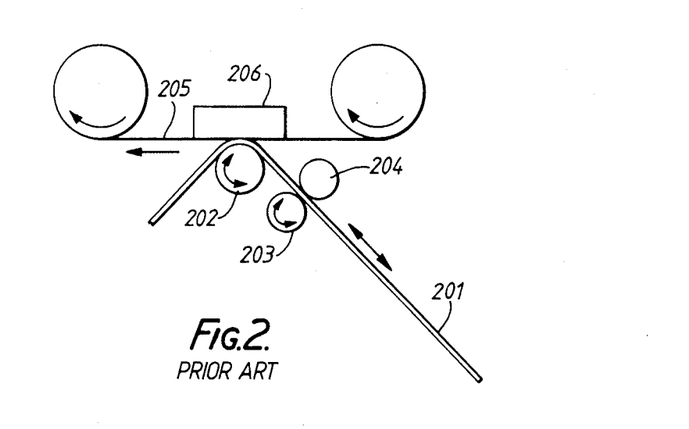
FIG. 2 is an illustration of one arrangement of conventional field sequential printing apparatus.

Turning now to FIG. 2, one arrangement of field sequential printing known in the art is shown. As shown in FIG. 2, paper 201 is conveyed in a forward direction by platen roller 202, driving roller 203 and pinch roller 204. Ink ribbon 205 is also conveyed in the forward direction at the same speed as the paper by suitable conveying means. The ink field of ink ribbon 205 comes in contact with paper 201 at the position where platen roller 202 is closest to the line of heat generating elements in thermal printing head 206. While the ribbon is conveyed in the forward direction, image signals are applied selectively to the heat generating elements, thereby printing the requisite portion of the image with the first color. Thereafter, platen roller 202 moves away from thermal printing head 206, and paper 201 is conveyed in a backward direction until the leading edge of the paper reaches the beginning print position. Then, ink ribbon 205 is conveyed until the beginning portion of the next color segment is reached. Thereafter, platen roller 202 returns to its print position and the printing of the next color is executed in the same manner as described above. The printing of the remaining colors are executed in the same fashion.

While the device shown in FIG. 2 reproduces color images using a field sequential printing technique, the dead time, caused by the necessary realignment of the paper back to its leading edge position for every color change, makes this type of system impractical for high speed printing applications. Other types of systems, such as that shown in FIG. 3, have been developed for trying to minimize or eliminate this dead time.

Figure 3:
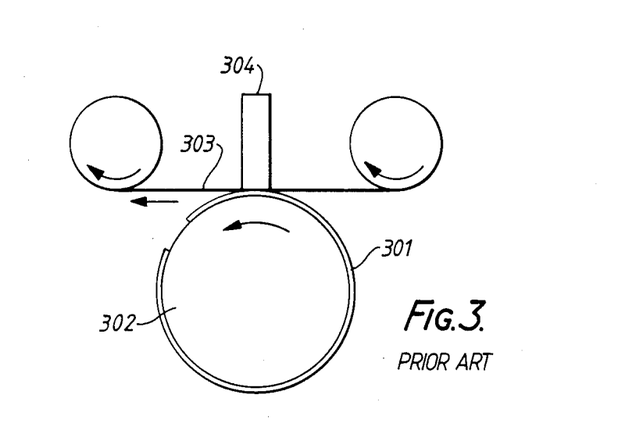
FIG. 3 is an illustration of another arrangement of a conventional field sequential printing apparatus.

Turning now to FIG. 3, another arrangement of field sequential printing is shown. Recording medium 301 is would around drum-shaped platen 302 and comes in contact with the ink layer of ink ribbon 303 where the drum and printing head 304 are in closest contact. In this arrangement, the length of each segmented color layer corresponds to the circumference of platen 302. The printing of multiple colors is performed by continuously conveying ink ribbon 303 and rotating platen 302 at the same tangential velocity as that of the ink ribbon for the requisite number of cycles as determined by the number of unique colors on the ribbon. ehe thermal printing head is driven in accordance with the desired image to be printed. Paper 301 is separated from platen 302 after printing and discharged.

While the device shown in FIG. 3 minimizes dead time for paper lengths corresponding to the circumference of the platen, a substantial dead time will still be present when smaller-lengthed paper is used. Accordingly, the printing time corresponds to the size of the drum and is independent of paper size. Additionally, the device not only requires a complicated mechanism to wrap and separate the paper automatically, but the device also requires a special shaped thermal printing head. These requirements add significantly to the cost of the device. Furthermore, since the platen is large and requires a driving motor which will handle the inertia of the platen, it is not possible to package the arrangement in a small or compact way.

SUMMARY OF THE INVENTION

Accordingly, it is an object of the present invention to provide a field sequential printing apparatus for reproducing multiple-color images wherein the dead time is both minimal and independent of printing medium length, and thus capable of high-speed and efficient printing.

Additionally, it is an object of the present invention to provide such an apparatus in an arrangement which minimizes package size.

In accordance with the objects of the present invention, a paper circulating assembly is provided for use in a field sequential printing apparatus. The field sequential printing apparatus is described with reference to a facsimile device which receives data regarding a multiple-color image and prints the multiple-color image in accordance with a field sequential printing technique. The facsimile includes an ink ribbon which runs between a printing head and a printing platen and has a plurality of individual color ink segments. A piece of paper onto which a multiple-color image is to be printed is conveyed from a paper tray to a printing paper path and between the ribbon and printing platen, and printing of the initial color of ink occurs. The printing platen conveys the leading edge of the printed paper in a generally downward direction, where it comes to rest against a gripping arm of the paper circulating assembly. The gripping arm is attached to a gripping platen and is able to both move against the surface of the platen to secure the leading edge of the paper and to move away from the surface of the platen to release the leading edge of the paper. After a predetermined time period corresponding to the time it takes the leading edge of the paper to rest in the gap created between the gripping arm and the gripping platen, the gripping arm closes against the gripping platen, thereby securing the leading edge of the paper against the gripping platen. Thereafter, the secured leading edge is conveyed to a recirculating paper path which flows into the printing paper path. The gripping platen stays in this position until the trailing edge of the printing paper corresponds to the printing paper path. During this time, the portion of the paper which lies between the gripping arm and the printing head gathers in a loop in a paper loop area, located preferably below the paper circulating assembly. When the trailing edge of the paper is about to enter the printing paper path, the gripping platen is rotated and the gripping arm moves away from the surface of the gripping platen, thereby releasing the leading edge of the printing paper. Further rotation of the gripping platen conveys the leading edge of the paper into the printing paper path, just behind the trailing edge of the printing paper, and to the printing head and printing platen for printing the subsequent color of ink. This process continues until all ink colors have been printed onto the paper. After the printing of all the colors of ink on the ink ribbon, the facsimile device directs the leading edge of the printing paper to an output tray, thereby making the multiple-color image available to the receiving party for inspection.

DETAILED DESCRIPTION OF THE PREFERRED EMBODIMENTS

Figure 4:
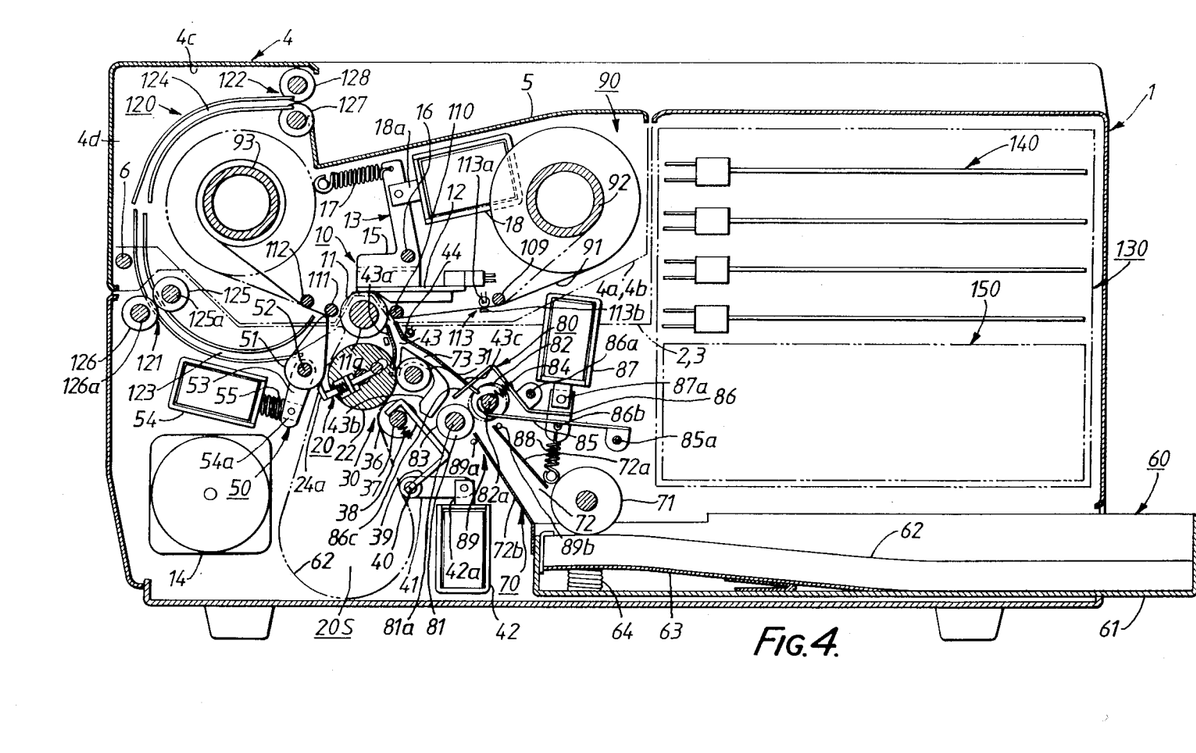
FIG. 4 is a vertical sectional view showing the paper circulating assembly and its associated assemblies of the present invention incorporated in a facsimile receiver employing a field sequential printing technique.

Turning now to FIG. 4, a vertical sectional view of a facsimile receiver in which the paper circulating assembly and its associated assemblies of the present invention are shown. The facsimile device includes casing 1 having side plates 2 and 3, fixed inside casing 1, to which various components hereinafter described are securely attached. Casing 1 also includes cover 4 having side walls 4a and 4b, ceiling board 4c and back end wall 4d. Ceiling board 4c is preferably formed with printed paper tray 5 for catching the output of the facsimile device. Side walls 4a and 4b are coupled to side plates 2 and 3 by pin 6 so that cover 4 is pivot about pin 6.

It is to be noted that the ribbon assembly and printing head separate from the unit when the cover plate pivots at pin 6. It will be appreciated by those skilled in art that this arrangement provides easy access to paper jam and ribbon changing operations.

Figure 11:
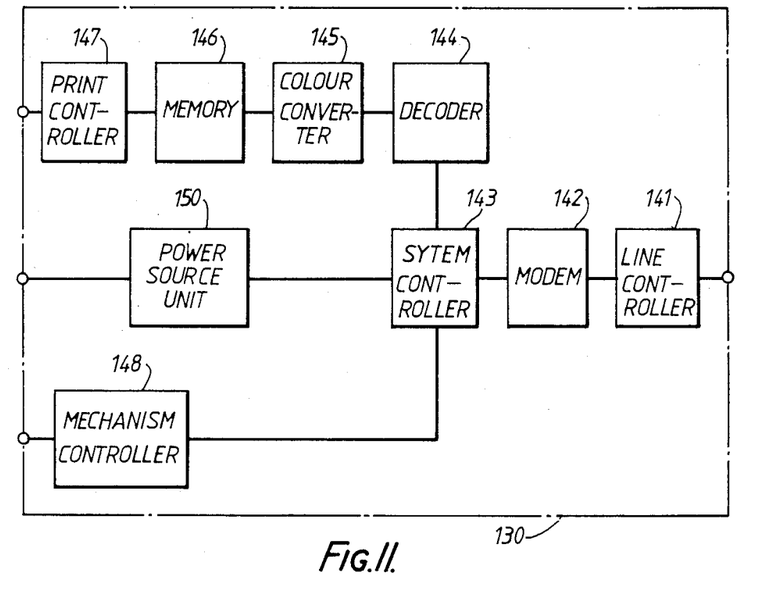
FIG. 11 is a block diagram of facsimile controlling unit 130 shown in FIG. 4.

The facsimile machine is controlled by facsimile control unit 130, which includes circuit boards 140 and power source unit 150. With reference to FIG. 11, control unit 130 includes line controller 141 for controlling the connection between the receiving facsimile of FIG. 4 and the transmitting facsimile (not shown) and modem 142 for demodulating the in-coming analog signals and converting them to digital data. System controller 143 controls the receiver operation according to the control data contained in the digital data from modem 142 or the user command data input through an operational panel (not shown) in the manner corresponding to the flowcharts of FIG. 13 through 15, described in detail below.

Decoder 144 decodes the digital data by a predetermined decoding method to obtain the image data of the facsimiled image to be printed. Color converter 145 converts the decoded image data into print data corresponding to the image's component colors. Page memory 146 stores the print data temporarily and print controller 147 controls the image printing process, which includes control of the micro front conversion, control of the driving pulses to be applied to the heat generating elements of the printing head, and so forth. Mechanism controller 145 controls the mechanical components of the receiver under the control of system controller 143. Power source unit 150 supplies the requisite power to the circuitry and mechanical components.

Returning to FIG. 4, paper tray unit 60 includes removable feed cassette 61 which is provided with plate 63 onto which the paper to be used during the printing process is housed. Plate 63 is typically biased due to compression spring 64 to ease paper feeding by feed roller 71 of initial feeder assembly 70. Feed roller 71 is coupled to stepping motor 14 by a one-way clutch (not shown).

Initial feeder assembly 70 also includes guide plates 72a and 72b defining paper feeding passage 72. Another paper feeding passage 73 is defined by guide plates 43b and 43c which feeds into printing paper path 43 defined by guide plates 43a and 43c.

The top-most sheet of paper from cassette 61 is directed by roller 71 up path 72 to paper straightening assembly 80, which includes feed roller 83 composed of driving roller 81 and pinch roller 82. Shaft 81a of driving roller 81 is coupled to stepping motor 14 such that roller 81 and platen roller 11 rotate at the same time. Shaft 82a of pinch roller 82 is biased by spring 84 through a suitable bearing and comes in pressure contact with driving roller 81. One end portion of arm 85 is engaged to shaft 82a of pinch roller 82, and the other end portion is pivotable at pin 85a which is fixed to side plates Z and 3 at its ends. Arm 85 is brought in contact with pin 86, supported by pin 86a which is secured at side plates 2 and 3. One end of arm 86 is rotatable by plunger 87, which is biased downward by tension spring 88. The other end portion 86c is situated at a position behind feed roller 83 where it can prohibit temporarily the printing paper from progressing.

Paper straightening assembly 80 also includes detector 89 for detecting the leading edge of the paper. Paper detector 89 comprises photo-emitter 89a and photo-sensor 89b, and when the leading edge of the paper is detected, a timer starts clocking, as described in detail hereinafter. After a predetermined period, solenoid 87 is de-energized.

When solenoid 87 is de-energized, it pulls in plunger 87a and causes arm 86 to pivot about pin 86a, and arm 85 pivots about pin 85a, causing shaft 82a of pinch roller 82 to be pushed upward. Consequently. pinch roller 82 is detached from driving roller 81 and end portion 86c of arm 86 comes down to a position which prohibits paper movement up paper path 73. This causes the leading edge of the paper to be compressed against end portion 86c, thereby straightening the paper. After a predetermined time period, solenoid 87 is reenergized and arm 86 returns to its non-blocking position by tension spring 88, and end portion 86c of arm 86 comes up to release the paper. At the same time, pinch roller 82 comes back into pressure contact with driving roller 81 under the effect of spring 84, as illustrated by the phantom line in FIG. 1. The paper, now straightened, proceeds up paper path 43 where it is moved past thermal printing head 12 of printing assembly 10.

Printing assembly 10 comprises platen roller 11, printing head 12 and printing head placement mechanism 13. The printing head placement mechanism, as is discussed in greater detail below, places printing head 12 towards and away from platen 11 during printing and non-printing intervals, respectively. Platen roller 11 is preferably rubber and includes metal shaft 11a as the axis thereof. Both ends of shaft 11a are rotatably supported by side plates 2 and 3. Platen roller 11 is rotated by stepping motor 14. Printing head 12 has a line of heat generating elements, preferably 3456, aligned perpendicular to the paper path and at a density of 16 pel/mm. The driving pulse current is selectively applied to the individual elements by control unit 130 which selectively drives the elements according to the image information, as described above. In this way, the ink fuses to the paper as extremely small dots. Printing head 12 is mounted on L-shaped arm 15 which is supported by and pivotable about shaft 16, which is fixed at side walls 4a and 4b of cover 4. The printing head is normally under tension by tension spring 17 so that the optimum pressure for printing is applied to the ink ribbon and the paper by printing head 12 during the printing interval. When the ink ribbon is at the ink color transition point for the initial color, solenoid 18 pulls plunger 18a inwardly so that printing head 12 does not exert any pressure on platen roller 11.

Ink ribbon 91 is conveyed between platen roller 11 and printing head 12 by ribbon conveying assembly 90. Ink ribbon 91 comprises a base material having layers of thermally fusible solid ink of different coloring agents coated thereon in a predetermined order. Preferably, the length of each ink segment corresponds to the maximum printing paper length, and the width corresponds to the maximum printing paper width. More preferably, these dimensions are slightly larger than the maximum paper dimensions.

The ink ribbon preferably used in the present invention comprises the three colors typically used in substractive color printing, thereby allowing a total of seven colors to be printed on the printing medium. The ribbon, however, could comprise ink segments of colors to be printed individually rather than in an overlapping fashion.

Figure 9:
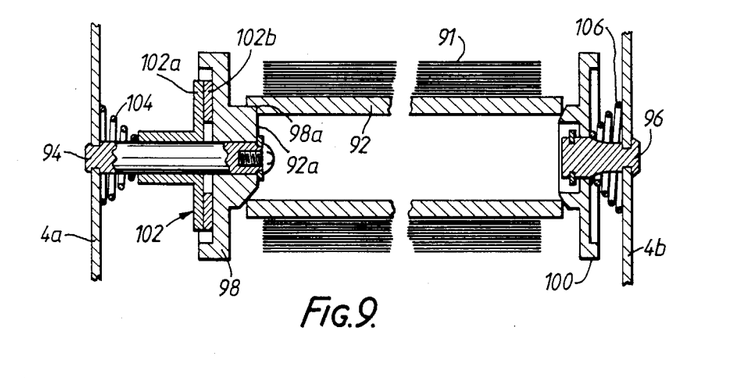
FIG. 9 is a vertical sectional view of ink ribbon feed roll 92 of FIG. 4.
Figure 10:
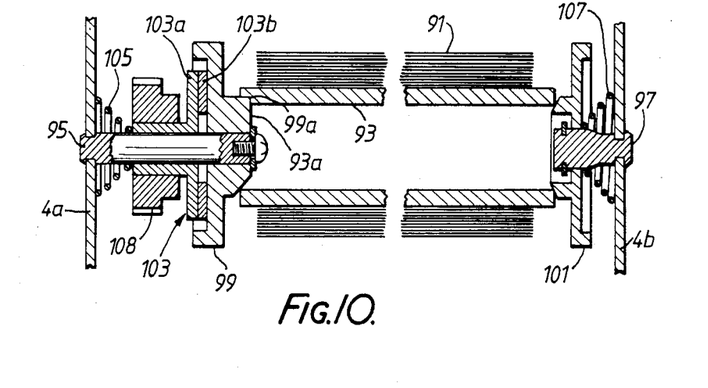
FIG. 10 is a vertical sectional view of ink ribbon take-up roll 93 of FIG. 4.

Ink ribbon 91 is wound around feed roll 92 and is taken up by take-up roll 93 after use. Feed roll 92 and take-up roll 93 are shown in detail in FIGS. 9 and 10, respectively. With reference to FIGS. 9 and 10, two pairs of shafts 94 and 96, and 95 and 97 are firmly fixed at side walls 4a and 4b, respectively. Reels 98, 99, 100 and 101 are loosely fitted to shafts 94, 95, 96 and 97, respectively. Reels 98 and 99 have at least one projection 98a and 99a, respectively, at their inner end. Projections 98a and 99a are adapted to engage grooves 92a and 93a so that feed roll 92 and take-up roll 93 are operatively connected to reels 98 and 99, respectively. Further, couplers 102 and 103 are slidably and rotatably mounted on shafts 94 and 95 and include circular disks 102a and 103a and friction plates 102b and 103b, respectively. Couplers 102 and 103 are biased due to compression springs 104 and 105, respectively, disposed between side wall 4a and the respective coupler. As a result, reels 98 and 99 are in pressure contact with feed roll 92 and take-up roll 93 via friction plates 102b and 103b, respectively. Similarly, reels 100 and 101 are in pressure contact with feed roll 92 and take-up roll 93 via compression springs 100 and 107, respectively. Further, coupler 103 has timing pulley 108 for transferring rotational torque, and is operatively engaged to a suitable stepping motor via timing belt (not shown).

Returning to FIG. 4, ink ribbon 91 is positioned in its path by guide bars 109 through 112 and is disposed between platen roller 11 and printing head 12. Ribbon conveying assembly 90 also includes ribbon detector 113 for detecting the borders of the ink segments, and comprises photoemitter 113a and photo-sensor 113b. Ribbon detector 113 could comprise multiple photo-sensors to detect the multiple ink segments; however, in the preferred embodiment, photo-sensor 113b generators detection signals of different voltage levels corresponding to the different colors. The detection signals are used in conjunction with those provided by paper detection 44 for matching the timing between color segment transitions of ink ribbon 91 and paper 62. In the preferred embodiment, the time required for the ribbon to travel between the ribbon detector and the printing head 12 is substantially equal to the time required for the paper to travel between end portion 86c of arm 86 and the printing head.

Once the leading edge of the paper has passed under printing head 12, the paper travels past paper guide flap 51 to arm 24a of paper circulating assembly 20. The function of paper circulating assembly 20 is to insure that the paper gets passed under printing head 12 the required number of times, corresponding to the number of different ink colors on ribbon 91. This function is performed by arm 24a and roller 22 as follows: when the leading edge of the paper is detected at arm 24a, the arm retracts into roller 22, securing the leading edge of the paper to the roller. Then, at a speed corresponding to the movement of the paper past the printing head, roller 22 rotates counter-clockwise approximately 150° and stops, yet still securing the leading paper edge. The paper continues to travel past the printing head, and gathers in a loop in paper loop area 20S. When the trailing edge of the paper is detected by detector 44, but more preferably after a predetermined time period corresponding to the paper length, roller 22 again begins to rotate counter-clockwise, simultaneously extending arm 24a to release the leading edge of the paper, and coming to rest at its initial position shown in FIG. 4. The paper, through the assistance of circulation feeding assembly 30, is conveyed up the recirculating paper path which flows into printing paper path 43 and once again passes under the printing head.

This procedure continues until the paper has passed under the printing head the requisite number of times, at which point paper guide flap 51 is flipped to the position shown by the phantom line and the finished and reproduced image is output with the assistance of paper discharge assembly 120. As will be appreciated by those skilled in the art, the paper circulating unit and its associated assemblies not only reduce the size of the platen and associated components, allowing the facsimile receiver to be assembled in a compact package, but the system more importantly substantially minimizes the dead time by making it independent of paper size.

Figure 5:
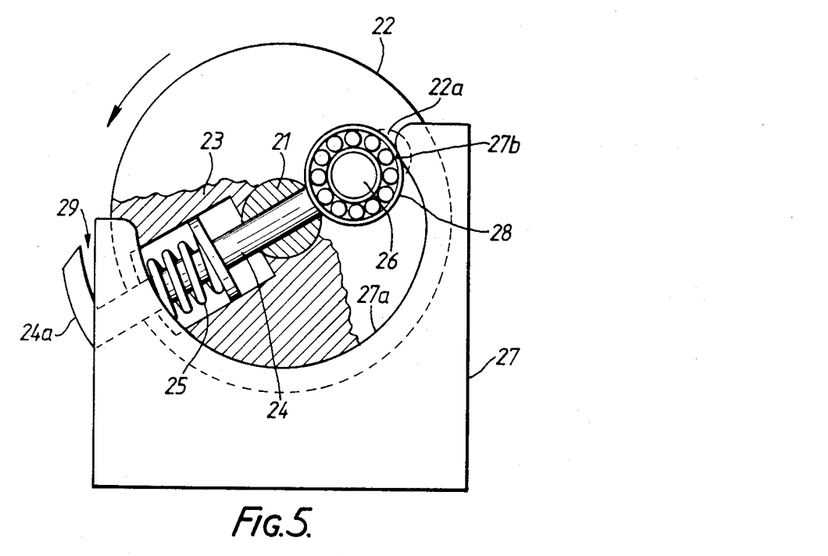
FIG. 5 is a partially sectional side view of grip roller 22 of the paper circulating assembly of FIG. 4.

The detailed operation of paper circulating assembly 20 and its associated assemblies is not discussed with reference to FIGS. 5 through 7. Turning now to FIG. 5, a partial sectional view of grip roller 22 is shown, and includes shaft 21, supported by side plates 2 and 3 (FIG. 7) and driven by stepping motor 14 (FIG. 4) via electromagnetic clutch (not shown), and gripping mechanism 23 disposed inside roller 22. As shown in FIG. 7, paper circulating assembly 20 preferably includes three grip rollers 22 with the gripping mechanism having arm 24a secured thereto by three rods (24 of FIG. 5), and each arm being the same length as grip roller 22.

Returning now to FIG. 5, gripping mechanism 23 is shown with compression spring 25 about each rod 24, and pin 26, shown within hole formed by phantom line 22a. Rod 24 abuts pin 26 via cam follower 28. As shown in FIG. 7, pin 26 is supported by cams 27 mounted on side plates 2 and 3, respectively, through cam followers 28.

Figure 6:
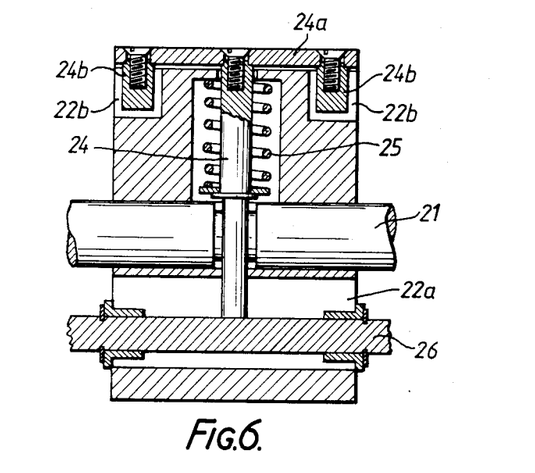
FIG. 6 is a vertical sectional view of the grip roller of FIG. 5.
Figure 7:
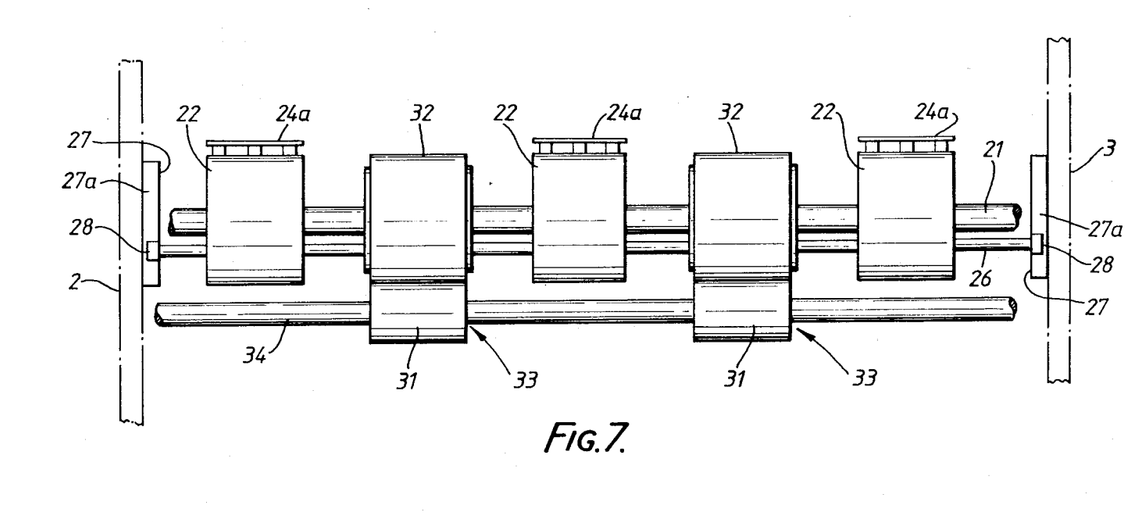
FIG. 7 illustrates the preferred embodiment of a portion of the paper circulating and associated assemblies of FIG. 4.

Turning now to FIG. 6, a vertical sectional view of the grip roller of FIG. 5 is shown. Two blocks 24b are mounted on either side of gripping arm 24a. These blocks fit into their respective recesses 22b defined as the cut-away portions of grip roller 22. Therefore, gripping arm 24a is prohibited from rotating about the axis of rod 24. Cam followers 28 mounted on the both ends of pin 26 are the ball bearings (shown in FIG. 5) brought in contact with contact surface 27a of cam 27.

Returning to FIG. 5, the action of the cam and gripping arm interaction will now be explained. When cam follower 28 is at raised portion 27b of cam 27 (its waiting position), pin 26 forces gripping arm 24a to move away from the surface of gripping roller 22, forming gap 29. At an appropriate time, the leading edge of the paper will be at gap 29 and shaft 21 is rotated counter-clockwise so that cam follower 28 is no longer in cam 27 (an arc of about 150°). During this time period, arm 24a is in close contact with roller 22, and the leading edge of the paper is brought to rest near raised portion 27b. At the point in time when the paper's trailing edge is past paper path 73 (as described above), shaft 21 again rotates, causing cam follower to contact cam 27 at surface 27a and gripping arm 24a opens slightly so that the leading edge of the paper can again circulate through the printing head. The shaft continues to rotate to raised portion 27b where the gripping arm opens fully and again waits for the leading edge of the paper.

As shown with reference to FIGS. 4 and 7, recursive paper feeder assembly 30 helps feed the leading edge of the paper back through paper path 43 and under the printing head and includes two feed rollers 33, each of which is composed of driving roller 31 and pinch roller 32. Driving rollers 31 are mounted on shaft 34, supported by side plates 2 and 3, and are rotated by another stepping motor (not shown). Pinch rollers 32 and grip rollers 22, preferably are alternately disposed, as shown in FIG. 7.

Figure 8:
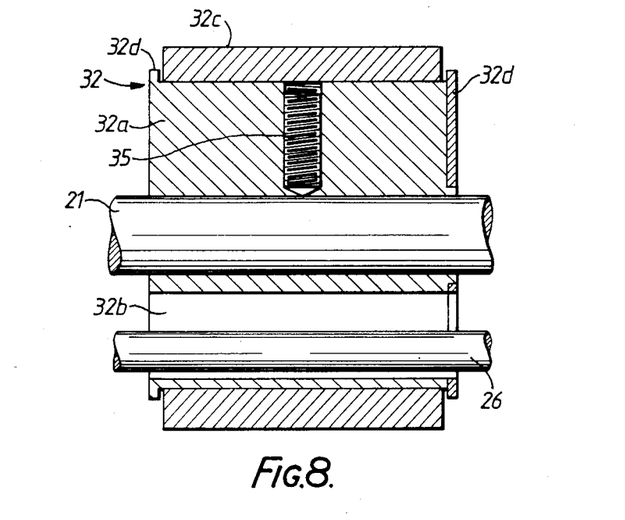
FIG. 8 is a vertical sectional view of the pinch roller 32 shown in FIG. 7.

Turning now to FIG. 8, a vertical sectional view of the pinch roller of FIG. 7 is shown, and includes main portion 32a of pinch roller 32 coupled to shaft 21 by means of setscrew 35. Main portion 32a is formed with hole 32b to permit pin 26 to extend therethrough. Sleeve 32c is loosely fitted round main portion 32a and is restricted by two collar 32d. Driving roller 31 and pinch roller 32 are in contact with each other; when driving roller 31 rotates, sleeve 32c of pinch roller 32 also rotates.

Returning to FIG. 4, recursive paper feeding assembly 30 also includes backtension roller 36 mounted on shaft 37 which is supported by side plates 2 and 3 and is movable in the direction shown by the phantom line. Shaft 37 is biased toward grip roller 22 by spring 38 to permit backtension roller 36 to come into pressure contact with grip roller 22, and is biased slightly by braking mechanism (not shown) so as to be braked against rotational movement caused by grip roller 22. Arm 39 is movably coupled to shaft 37 and fixed to shaft 40, which is supported by side plates 2 and 3. One end portion of lever 41 is firmly fixed to shaft 40, and the other end portion is coupled to plunger 42a of solenoid 42. When solenoid 42 is energized, lever 41 pivots about the axis of shaft 40, causing arm 39 to rotate about the axis of shaft 40, and backtension roller 36 is detached from grip roller 22.

During the recursive paper feeding of the paper's leading edge to platen 11, paper guide flap 51 of guiding assembly 50 remains in the position shown in FIG. 4. Paper guide flap 51 is pivotable about shaft 52, which is supported by side plates 2 and 3. Lever 53 is fixed to shaft 52 and rotatably mounted to plunger 54a of solenoid 54. Paper guide flap 51 is kept in the position shown under the force of compression spring 55, which is loosely fitted aroung plunger 54a. At the end of the recursive paper feeding cycle when the leading edge has been passed through the printing head for the last required time, solenoid 54 is energized and flap 51 pivots to the position illustrated by the phantom line, permitting the paper to progress toward paper discharging assembly 120.

Paper discharging assembly 120 includes feed rollers 121 and 122 and paper discharging passages 123 and 124 defined by two pairs of guide plates. Feed roller 121 is composed of driving roller 125 and pinch roller 126. Shaft 125a of driving roller 125 is operatively engaged to stepping motor (not shown), and shaft 126a of pinch roller 126 is biased towards driving roller 125 by a spring (not shown). Feed roller 122 is also composed of driving roller 127 and pinch roller 128, and is substantially similar to feed roller 121. The paper discharged to paper tray 5 is a multiple-color copy of the image which was transmitted from a facsimile in communication with the facsimile of FIG. 4.

Figure 13:
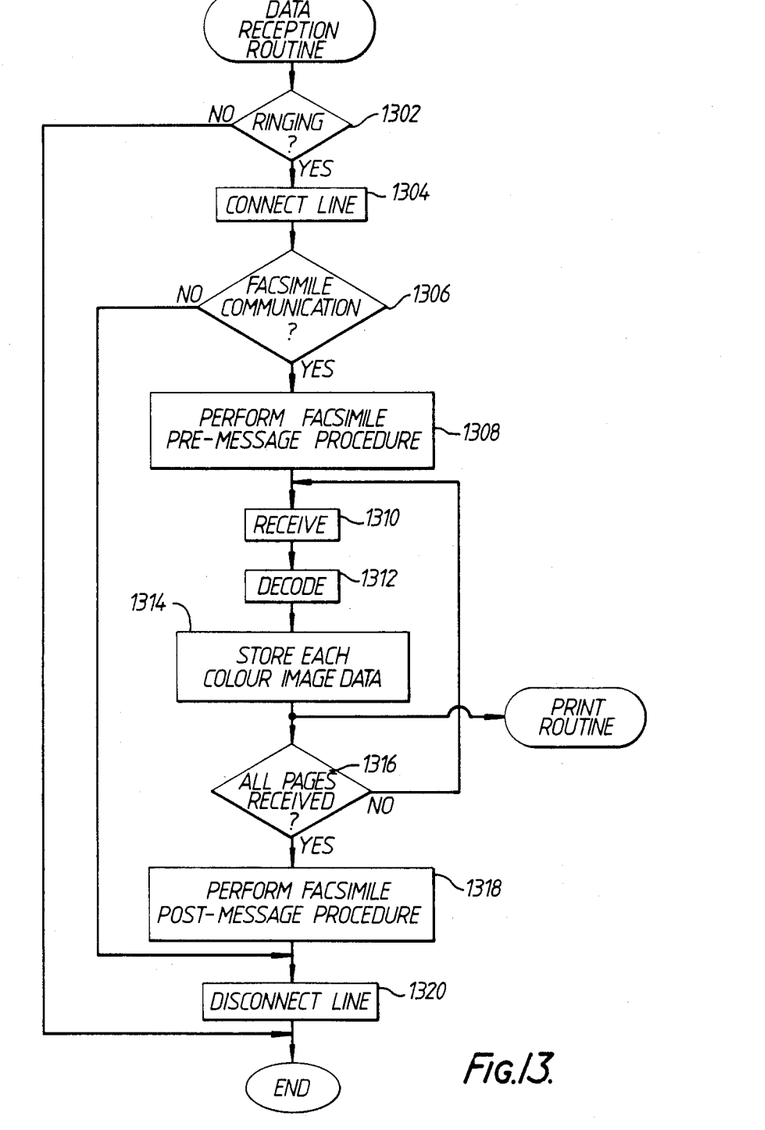
FIG. 13 shows the routine regarding the reception of the color image data from a transmitting facsimile.

A description of the operation regarding the receipt and processing of the multiple-color image from the transmitting facsimile is now discussed with reference to FIGS. 13 through 15. Turning now to FIG. 13, the routine regarding the reception of the facsimilied data is shown. With reference to control unit 130 of FIG. 11, when the facsimile receives a telephone call (step 1302), line controller 141 (FIG. 11) connects the system to the telephone line (step 1304) and determines whether the call is from a proper facsimile device (step 1306) via a handshake protocol routine, a process known in the art. If so, system controller 143 (FIG. 11) continues its handshake protocol routine, performing a facsimile pre-message procedure (step 1308) in cooperation with modem 142 (FIG. 11). If the call is not from a proper facsimile device, the telephone line is disconnected (step 1320).

After the pre-message procedure, modem 142, in cooperation with system controller 143, begins to receive (step 1310) the modulated color image signal which is developed at the transmitting facsimile by a process known in the art. The color image signal is demodulated by modem 142, decoded (step 1312) by decoder 144, resolved into its color components by color converter 145, and stored in page memory 146 (step 1314). After an entire page is stored, print controller 147 controls the printing as described below with reference to FIGS. 14 and 15.

Throughout the printing operation, system controller 143 also controls the receipt of subsequent pages (step 1316) until all data has been received. After the end of data transmission regarding the color image, a facsimile post-message procedure (step 1318) is performed, the line is disconnected (step 1320) and the facsimile device awaits another call.

Figure 14A:
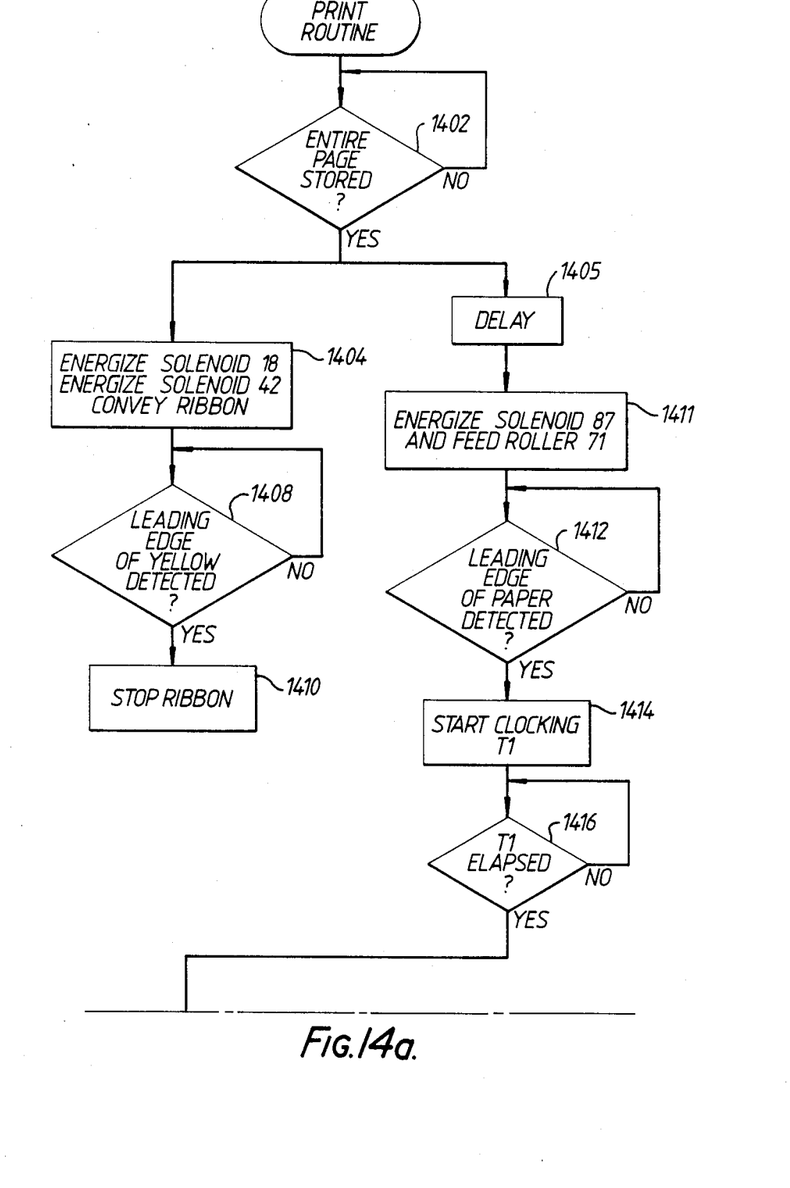
FIG. 14 illustrates the mechanical control of the facsimile of FIG. 4 during the routine of printing the multiple-color image received from a transmitting facsimile.
Figure 14B:
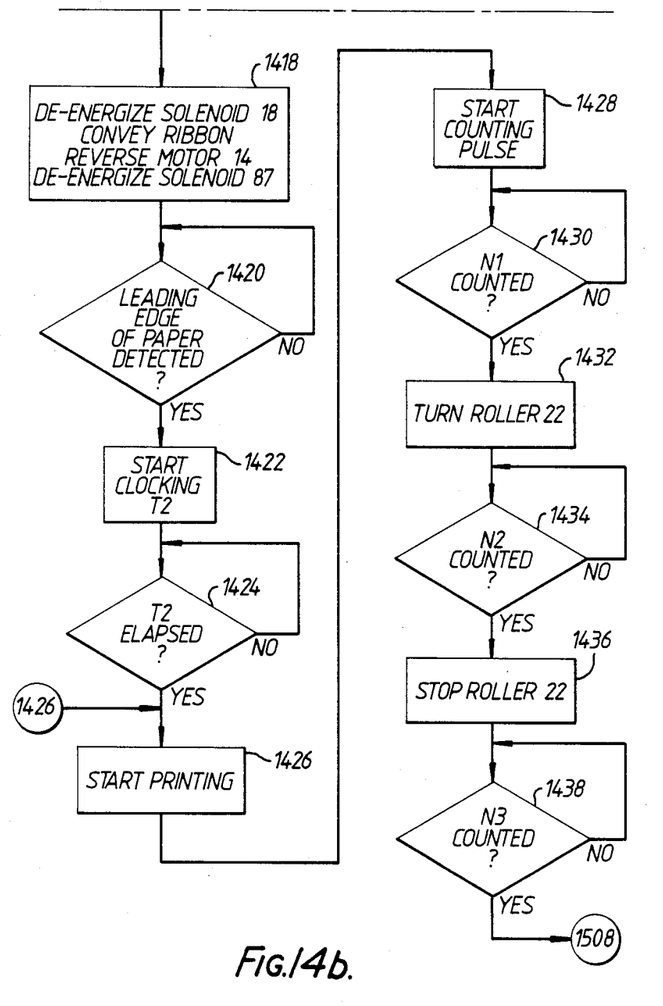
Figure 15A:
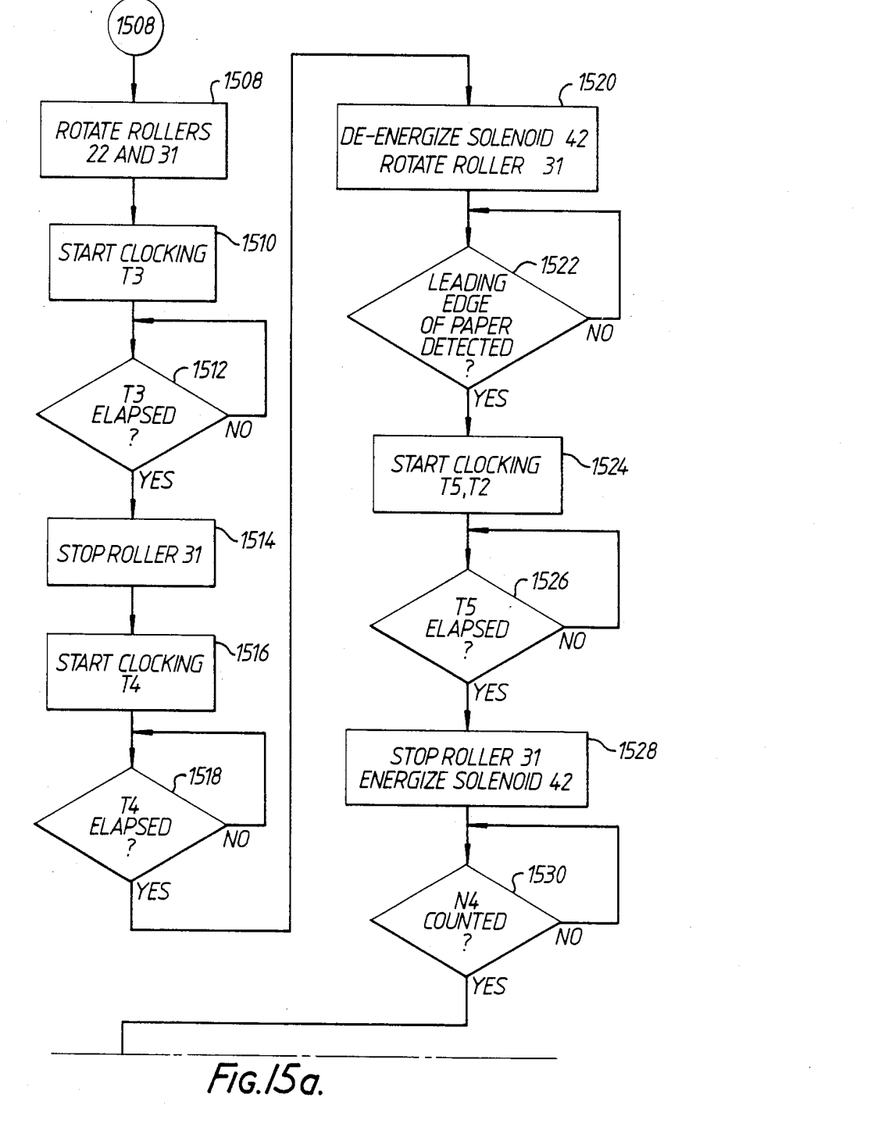
FIG. 15 is a continuation of the mechanical control illustration of FIG. 14.
Figure 15B:
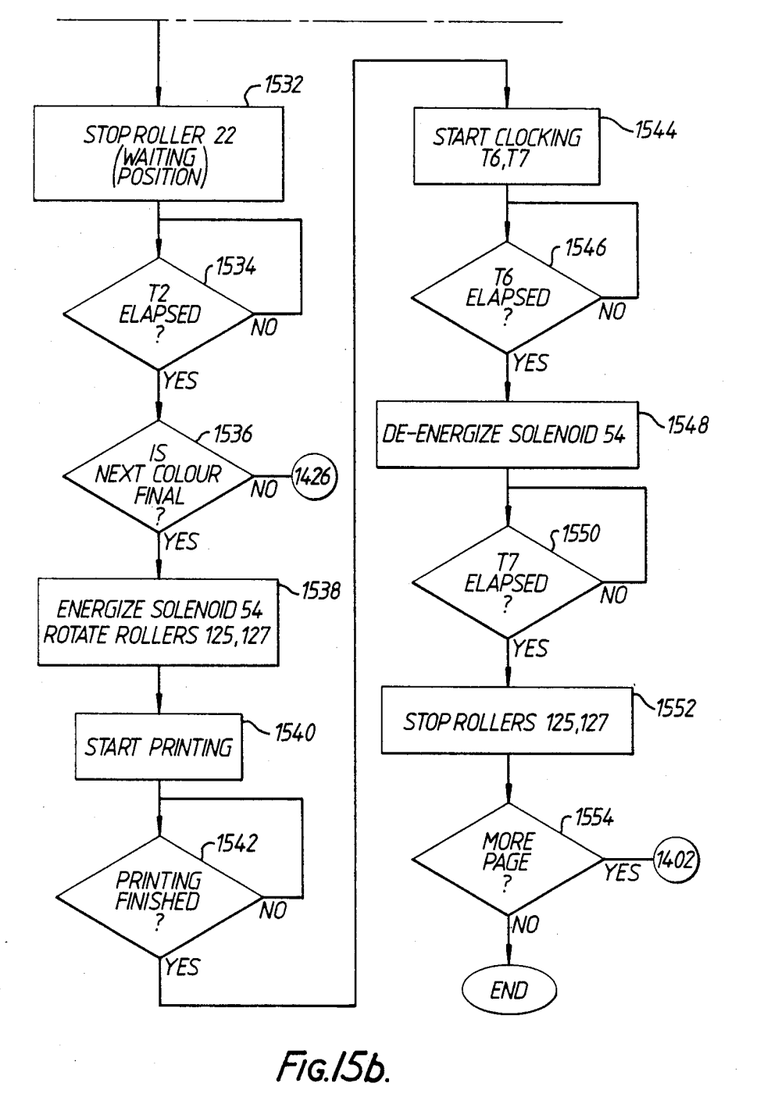

Turning now the FIGS. 14 and 15, the mechanical control of the facsimile of FIG. 4 during the print routine is discussed. It is to be implicit in the following discussion that all controllable mechanical components are under the control of system controller 143 via mechanism controller 148 or print controller 147 of FIG. 11.

As shown in FIG. 14, and with constant reference to FIG. 4, after an entire page of data is stored (step 1402), solenoids 18 and 42 are energized (step 1404), causing printing head 12 to separate from platen roller 11 and back tension roller 36 to separate from grip roller 22, respectively. Additionally, the ribbon conveying stepping motor is energized, causing ink ribbon 91 to progress until the leading edge of a specified ink color, preferably yellow, is detected by ribbon detector 113. Once the leading edge of the yellow ink segment is detected, the ribbon conveyance is halted (step 1410).

Concurrently with steps 1404, 1408 and 1410, feed roller 71 is energized to convey the top sheet in casette 61 to feed up passage 72 (step 1411). After a predetermined delay (step 1405), solenoid 87 is also energized, causing pinch roller 82 to separate from driving roller 81 and causing end portion 86c of arm 86 to move into the position shown in FIG. 4 so that the paper can be straightened. As the paper proceeds up passage 72 through the separation between rollers 81 and 82, its leading edge is detected (step 1412) by detector 89. The paper is further conveyed for a predetermined time period T1 (steps 1414 and 1416), causing the paper to bulge slightly due to the hindrance of arm 86c. The leading edge abuts arm 86c, thereby straightening the paper.

At the end of the time period T1, as the paper is now straight, solenoid 87 is de-energized (step 1418), causing arm portion 86c to move out of the paper path and pinch roller 82 to press against drive roller 81 via the paper. Additionally, feed roller 71 stops rotation, preferably by reversing stepping motor 14 so as to stop roller 71 rotation due to the non-driving effect of the one-way clutch, and the paper continues up paper path 73 via driving roller 81.

Furthermore, at the end of time period T1, solenoid 18 is deenergized causing printing head 12 to come into pressure contact with platen 11 and ink ribbon 91 also starts moving. As stated previously, the travel time between ribbon detector 113 and the printing head preferably equals the travel time between arm portion 86c and the printing head. Accordingly, the leading edge of the paper and the leading edge of the first color segment meet under the printing head preferably at the same time. To insure that printing preferably begins at the proper place, when the paper's leading edge is detected (step 1420) by detector 44, a predetermined time period T2 lapses (step 1424) before printing (step 1426) begins.

After time period T2, the image data relating to the first ink ribbon color is read from page memory 146 (FIG. 11) and the heat generating elements of printing head 12 are selectively enabled, causing the ink to fuse to the paper at the selective locations. At guide bar 111, ink ribbon 92 separates from the paper and heads to take-up roll 93, while the paper proceeds past paper guide flap 51 to gripping arm 24a.

Turning now to FIG. 12, a pictoral illustration of the paper circulating assembly and its associated assemblies is shown. With reference to FIG. 12(a), a detailed view of the initial paper entry into the paper circulating assembly is illustrated. At the beginning of the print routine (step 1426), predetermined time N1 begins to elapse (step 1428), allowing the paper to proceed under the printing head and towards gripping arm 24a. N1 is preferably the time period required for paper 62 to come in contact with arm 24a in a bulging manner so as to straigthen the leading edge of the paper against the arm, as shown in FIG. 12(a). In addition to N1, time periods N2, N3 and N4 begin to elapse; N1–N4 being dependent upon the rotational speed of platen 11 as rotated by stepping motor 14.

Figure 12A:
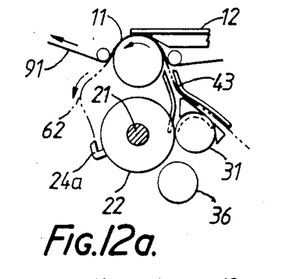
FIGS. 12(a)-(f) show a pictural illustration of the paper circulating assembly and its associated assemblies in the process of printing the multiple-color image.
Figure 12B:
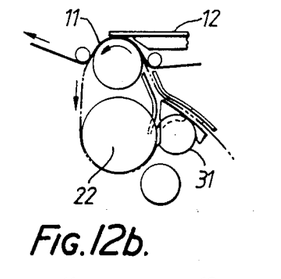

After time period N1 has lapsed (step 1430), grip roller 22 starts rotating counter-clockwise (step 1432) with the same tangential velocity as platen 11, causing arm 24a to retract into roller 22, as illustrated in FIG. 12(b). Roller 22 rotates for a predetermined time period N2 (step 1434), preferably allowing cam follower 28 (FIG. 5) to rotate from raised portion 27b, stopping (step 1436) just prior to cam surface 27, approximately 150°.

Figure 12C:
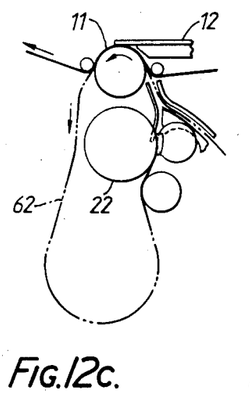

The printing process, meanwhile, has continued and continues to occur. The paper between gripping arm 24a and the printing head begins to gather in a loop in area 20S (FIG. 4), as shown in FIG. 12(c). Assuming preferably that only one size paper length is to be used by the facsimile device, the paper continues to accumulate in area 20S for predetermined time period N3 (step 1438), preferably defined as the time it takes the trailing edge of the paper to just about enter paper path 43, so that the leading edge and the trailing edge almost meet. At this point, rollers 22 and 31 begin to rotate (step 1508). Alternatively, rollers 22 and 31 can begin to rotate when the trailing edge is detected by detector 44. In fact, this arrangement can be used when multiple paper length sizes are to be used by the facsimile device.

Figure 12D:
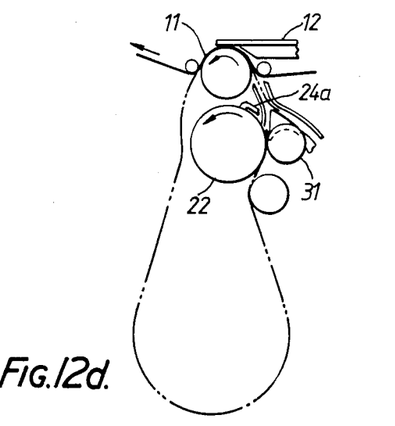

Roller 31 rotates for predetermined time period T3 (steps 1510 and 1512). Roller 22 also rotates for time period T3, causing cam follower 28 to rotate onto cam surface 27, causing gripping arm 24a to separate slightly from the surface of roller 22. At the end of the time period T3, roller 31 stops (step 1514) temporarily, preferably for predetermined time period T4 (step 1516 and 1518). At the end of time period T3. roller 22 still rotates to the position shown in FIG. 12(d) to release the leading edge of the paper completely. In the preferred embodiment, roller 22 reaches this position prior to the end of T4.

Figure 12E:
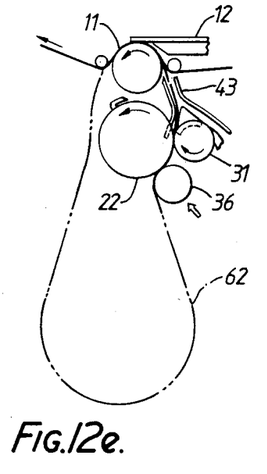

After time period T4 (step 1518), solenoid 42 is de-energized (step 1520), causing backtension roller 36 to come into pressure contact with grip roller 22, and roller 31 again begins to rotate, as shown in FIG. 12(e). Shortly thereafter, the leading edge of the paper is detected by detector 44 (step 1522) and time periods T5 and T2 begin to elapse (step 1524). In the preferred embodiment, T5 is less than T2.

Figure 12F:
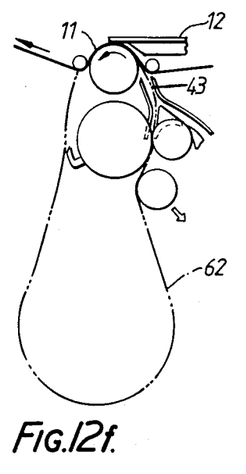

Driving roller 31 rotates during time period T5 (step 1526), causing the leading edge of the paper to follow its trailing edge. In the preferred embodiment, T5 is the time period required for the leading edge of the paper to move between the printing head and rotating platen 11. Accordingly, at the end of T5, roller 31 is no longer necessary for paper conveyance and is stopped (step 1528). Because of the arrangement of the ink segments on ribbon 91, the leading edge of the paper and the subsequent ink segment coincide. Additionally, at the end of T5, solenoid 42 is re-energized, causing backtension roller 36 to move away from grip roller 22, as shown in FIG. 12(f). Finally, after time period N4 is reached (step 1530), roller 22 is back to its waiting position and its rotation is therefore stopped (step 1532).

At the end of the time period T2 (step 1534), the leading edges of the paper and the subsequent ink segment reach the printing head for the application of the next color of ink. If the next color is not the last to be printed (step 1536), the paper circulation routine (steps 1426 through 1534) is repeated. Otherwise, solenoid 54 is energized (step 1538), causing paper guide flap 51 to direct the printed paper through paper paths 123 and 124 via rollers 125 and 127, respectively, as the final color is printed (step 1540).

When the printing of the last page is completed (step 1542) and the trailing edge of the finished page is past flap 51 (determined by T6 of steps 1544 and 1546), solenoid 54 is de-energized (step 1548), causing flap 51 to return to its paper circulating position. When the finished page is completely discharged to tray 5 (determined by T7 of steps 1544 and 1550), discharge rollers 125 and 127 stop (step 1552). If more pages are to be printed, the PRINT ROUTINE is started again; otherwise, the facsimile post-message procedure and line disconnect of FIG. 13 occurs, thereby ending the facsimile transmission.

Illustrative embodiments of the present invention have been described in detail with reference to the accompanying drawings. However, various changes and modifications may be effected therein by one skilled in the art without departing from the scope or spirit of the invention.

For example, the operation of the paper circulating assembly can be controlled by a solenoid and associated linkage as opposed to compression spring 25 and cam 27, respectively. Also if the component precision of the paper circulating assembly and its associated assemblies is highly accurate, the printing medium should not wander; therefore, backtension roller 36 and its associated solenoid components would not be required. Additionally, if platen roller 11 and feed roller 71 are driven by separate stepping motors, the printing head would not have to be detached from roller 11 prior to the printing of the initial color. Furthermore, in the preferred embodiment, the ink ribbon is synchronized with the leading edge of the paper by mechanically stopping the ribbon's conveyance. Synchronization can also be obtained by continuously conveying the ribbon and feeding the paper to the printing head when appropriate. Also, paper tray 60 could be replaced with a paper roller and appropriate paper cutting assembly.

Other changes and modifications will be obvious to those skilled in the art. Accordingly, it is to be understood that such changes and modifications do not depart from the scope or spirit of the present invention.

What is claim is:

1. In a field sequential printing apparatus for printing multiple-color images onto a printing medium using a ribbon having a plurality of color ink segments, the apparatus including a printing paper path leading to a printing head and printing platen, and a paper circulating assembly to convey the printing medium back to the printing head and printing platen after the printing of an initial ink color for the printing of at least one subsequent ink color, the method of conveying the printing medium back to the printing head and printing platen comprising the steps of:

conveying the leading edge of the printing medium, a first predetermined time period after the leading edge emerges from the printing head and printing platen, to a recirculation paper path which flows into the printing paper path;

delaying further conveyance of the leading edge of the printing medium for a second predetermined time period; and conveying the leading edge of the printing medium to the printing paper path for the printing of a subsequent ink color.

2. The method of claim 1 wherein said second predetermined time period corresponds to the arrival of the trailing edge of the printing medium at the printing paper path.

3. The method of claim 2 further comprising the step of directing the leading edge of the printing medium to an output paper tray after the final ink color has been printed.

4. The method of claim 1 wherein said step of delaying comprises the step of:

disabling the conveyance of the leading edge of the printing medium; and allowing the printing medium to gather in a loop during the second predetermined time period.

5. The method of claim 4 wherein said second predetermined time period corresponds to the arrival of the trailing edge of the printing medium at the printing paper path.

6. The method of claim 5 further comprising the step of directing the leading edge of the printing medium to an output paper tray after the final ink color has been printed.

7. The method of claim 1 further comprising the steps of:

detecting the leading edge of the initial ink color prior to the ink ribbon reaching the print head;

detecting the leading edge of the printing medium prior to its reaching the printing head; and conveying the ink ribbon and the printing medium so that the arrival of the leading edges of the initial ink color and the printing medium at the printing head substantially correspond.

8. A field sequential printing apparatus for printing multiple-color images onto a printing medium using a ribbon having a plurality of color ink segments, the apparatus including a printing paper path leading to a printing head and printing platen, and a paper circulating assembly to convey the printing medium back to the printing head and printing platen after the printing of an initial ink color for the printing of at least one subsequent ink color, said paper circulating assembly comprising:

means for securing the leading edge of the printing medium after it emerges from the printing head and printing platen;

means for conveying the secured leading edge of the printing medium to a recirculating paper path which flows into the printing paper path; and means for releasing the secured leading edge of the printing medium and conveying the released leading edge to the printing head and printing platen after a first predetermined time period.

9. The paper circulating assembly of claim 8 wherein the first predetermined time period corresponds to the arrival of the trailing edge of the printing medium at the printing paper path.

10. The field sequential printing apparatus of claim 9 further including a paper loop area in which to allow the portion of the printing medium between said securing means and the printing head to gather during said first predetermined time period.

11. The field sequential printing apparatus of claim 8 further including:

an output tray; and means for directing the printing medium from the printing head to the output tray after the final ink color has been printed.

12. The field sequential printing apparatus of claim 8 further including:

a housing to contain the printing medium, printing platen and paper circulating assembly; and a cover, pivotally connected to said housing, to which the ribbon, ribbon conveying means and printing head are secured.

* * * * *